United States Patent
Dupriez

(10) Patent No.: US 7,037,230 B2
(45) Date of Patent: May 2, 2006

(54) SPEED TRANSMISSION APPARATUS

(76) Inventor: Charles Louis Dupriez, Avenue Princesse Paola, 6, Waterloo (BE) 1410

( * ) Notice: Subject to any disclaimer, the term of this patent is extended or adjusted under 35 U.S.C. 154(b) by 77 days.

(21) Appl. No.: 10/482,287

(22) PCT Filed: Jul. 3, 2002

(86) PCT No.: PCT/BE02/00112

§ 371 (c)(1),
(2), (4) Date: Dec. 30, 2003

(87) PCT Pub. No.: WO03/004905

PCT Pub. Date: Jan. 16, 2003

(65) Prior Publication Data

US 2004/0166979 A1  Aug. 26, 2004

(30) Foreign Application Priority Data

Jul. 4, 2001 (BE) .................................. 2001/0451

(51) Int. Cl.
*F16H 3/72* (2006.01)
*F16H 37/06* (2006.01)

(52) U.S. Cl. .................... 475/5; 475/330; 475/338; 475/339; 477/5; 180/65.2

(58) Field of Classification Search ............... 475/5, 475/330, 338, 339; 477/5; 180/65.2; 290/40 C
See application file for complete search history.

(56) References Cited

U.S. PATENT DOCUMENTS 5,751,081 A * 5/1998 Morikawa .................... 310/83
6,398,685 B1 * 6/2002 Wachauer et al. .......... 475/149

FOREIGN PATENT DOCUMENTS

| EP | 1092583 A1 * | 4/2001 |
| EP | 1 097 830 A | 5/2001 |
| FR | 990 810 A | 9/1951 |
| FR | 2 774 040 A | 7/1999 |
| FR | 2783764 A1 * | 3/2000 |
| FR | 2792582 A1 * | 10/2000 |

* cited by examiner

*Primary Examiner*—Charles A. Marmo
*Assistant Examiner*—David D. Le
(74) *Attorney, Agent, or Firm*—Sughrue Mion, PLLC

(57) ABSTRACT

A speed transmission apparatus containing a first rotary crankcase, a double planetary gearset, a first rotation transmission arranged at an intermediate output of the first gearset, a second rotation transmission arranged at an intermediate input of the second gearset, a first intermediate shaft arranged in one of the first and second transmissions, a first electric compression brake acting on the first intermediate shaft and capable of modifying a rotational speed thereof, a computer electrically connected to the first compression brake, and an electrical connection capable of being provided between the first compression brake and a second compression brake whereof the effect is to accelerate the second intermediate shaft by the braking effect exerted on the first intermediate shaft by the first compression brake.

12 Claims, 2 Drawing Sheets

SPEED TRANSMISSION APPARATUS

BACKGROUND OF THE INVENTION

The present invention relates to a speed transmission apparatus arranged between a drive engine and a drivable receiving device, for example a machine to be driven, industrial or agricultural, or the wheels of a motor car.

At the present time this transmission takes place by means of a gearbox provided with a defined number of ratios. The drawback of this type of transmission is its discontinuity. It can take place only by successive jumps.

In order to attempt to remedy this problem, there have already been provided, in the case of engines of low or medium power, transmission devices, known as continuous variators, which can however not be used for high powers, greater than approximately 40 continental HP (29.420 W).

For engines with higher powers, the use of automatic gearboxes has been provided for, which make it possible to avoid manual actions for changing transmission ratios, but the aforementioned discontinuity remains.

SUMMARY OF THE INVENTION

The aim of the present invention is to develop a speed transmission apparatus making it possible to modify the transmission ratio without discontinuity, between two selectable given limits, and without power limitation. Advantageously the transmission apparatus can be controlled manually or entirely automatically, or by combining the two modes.

To resolve these problems, there has been provided, according to the invention, a speed transmission apparatus, arranged between a drive engine and a drivable receiving device, comprising a first rotary casing arranged so as to be able to turn about a first axis of rotation, a double epicyclic gear train which comprises a first train and a second train and which is arranged at least partially in the said first rotary casing, between a driving input connected to the drive engine and an output shaft, arranged so as to be able to rotate about a second axis of rotation and connected to the drivable receiving device, the above-mentioned double train establishing between the driving input and the output shaft a transmission ratio between an input rotation speed and an output rotation speed, a first rotation transmission arranged at an intermediate output of the first epicyclic gear train, a second rotation transmission arranged at an intermediate input of the second epicyclic gear train, a first intermediate shaft arranged in one of the said first and second rotation transmissions, so as to be able to rotate about a third axis of rotation, a first electric motor brake acting on the first intermediate shaft and capable of modifying a speed of rotation thereof, and control means electrically connected to the first motor brake and controlling this so as to be able to continuously modify the speed of rotation of the first intermediate shaft and therefore the transmission ratio between the said input rotation speed and the said output rotation speed.

It is thus possible to provide a continuous speed variation between two theoretical limits, when the drive engine is rotating in a given direction (forward or reverse). The limits are a maximum output speed when the motor brake completely locks the intermediate shaft and the drive engine is at its maximum power and a zero output speed when the input speed is zero. The speed variation range therefore depends solely on the transmission ratio pre-established by the double epicyclic gear train chosen and the application under given conditions firstly of the appropriate input speed and secondly of the motor brake on the intermediate shaft in order to obtain the appropriate output speed, the latter being able to be positive or negative with respect to the drive engine.

According to one embodiment of the invention, the apparatus also comprises a second intermediate shaft arranged in the other one of the said first and second rotation transmissions, so as to be able to rotate about a fourth rotation axis, and a second electric motor brake which acts on the second intermediate shaft, whilst being capable of modifying a speed of rotation thereof, following commands received from the control means to which it is electrically connected. Preferentially, the first intermediate shaft and the second intermediate shaft have, in the absence of the motor brakes, different speeds of rotation, the motor brake acting on the fastest intermediate shaft is an alternator having coils, whose excitation can be varied in order to obtain a variable brake effect, and producing an electric current, and the motor brake acting on the slowest intermediate shaft is an electric motor, which is supplied by the electric current produced by the said alternator and which makes it possible to obtain a variable acceleration effect. This arrangement is particularly advantageous since it makes it possible to recover the energy developed by the braking of the first intermediate shaft and to use it for starting an electric motor which accelerates the second gear shaft, with the result of more effectively obtaining the required effect, that is to say a modification to the gear ratio.

The continuous variation in the motor brake effect is obtained by varying the excitation of the coils of the alternator, this variation being produced by means of the control means, either manually or by a computer which will take account of various data, such as for example the speed of the output shaft, the rotation speed at the input, the transmission power demanded, in a similar manner to what happens in an automatic gearbox. However, unlike the latter, the control means will now act continuously rather than in jumps as from certain limits.

According to one embodiment of the invention, the first epicyclic gear train comprises an input shaft arranged at least partially in the first rotary casing so as to be able to rotate about a first rotation axis and this input shaft is connected to the drive engine and serves as a driving input.

According to another embodiment of the invention, the apparatus comprises a second rotary casing which is arranged so as to be able to rotate about a fifth rotation axis and in which there is housed the second epicyclic gear train of the said double train, which allows a transmission of rotation to the output shaft, the first gear train being housed in the first rotary casing. Here the double epicyclic gear train is divided into two separate trains which are each housed in its own rotary casing.

According to a particular embodiment of the invention, the first rotary casing is arranged so as to be driven in rotation by the drive engine, thus serving as a driving input for the apparatus, and the double gear train is housed in the first rotary casing. In such an embodiment, the double gear train is enclosed in a single chamber and the apparatus is relatively compact.

Other embodiments of the apparatus according to the invention are indicated in the accompanying claims.

Other details and particularities of the invention will emerge from the description given below, non-limitingly and with reference to the accompanying drawings.

DETAILED DESCRIPTION OF THE INVENTION

In the various drawings, the identical or similar elements are designated by the same references.

Figure 1:
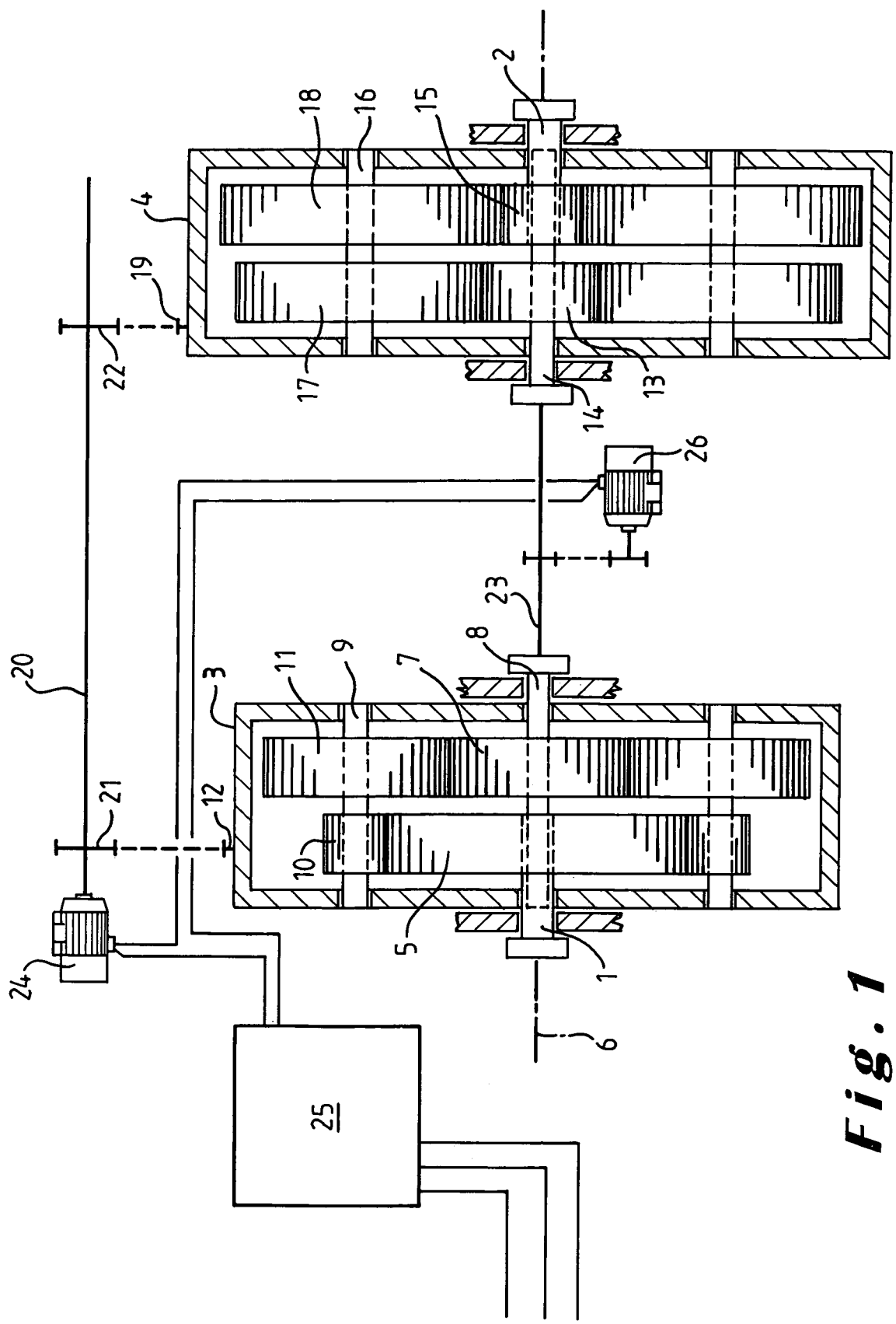
FIG. 1 depicts a schematic embodiment, partially in section, of an apparatus according to the invention.

In FIG. 1, the transmission apparatus depicted is arranged between a normal drive engine, not shown, and coupled to an input shaft 1, and a normal drivable receiving device, not shown, and coupled to an output shaft 2.

The apparatus comprises a double epicyclic gear train which has a first epicyclic gear train housed in a first rotary casing 3 and a second epicyclic gear train housed in a second rotary casing 4. Each rotary casing, with its gear train, is a known system which can be found on the market for example under the name Redex epicyclic system (the firm Texrope, Industrial Transmission Company).

The first gear train comprises a first sun-carrier plate 5, mounted on the input shaft 1 so as to rotate with it, about its rotation axis 6, and a second sun-carrier plate 7, mounted on a interposed output shaft 8 so as to be able to rotate with it, about this same rotation axis 6.

The input shaft 1 partially projects out of the casing 3, which is coaxial with it, so as to be able to rotate freely with respect to the casing. In the example illustrated this input shaft 1 is hollow and serves as guidance centred on the interposed output shaft 8, also coaxial with the input shaft, and also partially projecting out of the casing 3, so as to be able to rotate freely with respect to the latter.

In the casing 3 illustrated in FIG. 1, several pivot shafts 9 are supported parallel to the rotation axis 6, so as to be able to rotate freely on themselves, but so as to be driven in revolution about the rotation axis 6 when the casing 3 effects a rotation. Each pivot shaft 9 carries two planets 10 and 11 so that they rotate conjointly with this pivot shaft. Each planet 10 and 11 is in engagement with one of the sun-carrier plates 5 and 7.

Finally, the rotary casing 3 has an engagement system, for example external teeth 12 depicted schematically, which can come into engagement with an external rotation transmission.

The diameters of the casing 3, of the sun-holder plates 5 and 7 and of the planets 10 and 11 are chosen so as to establish between the input shaft 1 and the interposed output shaft 8 a preselected transmission ratio (which can be modified according to the invention as described below).

The second gear train comprises a third sun-carrier plate 13, mounted on an interposed input shaft 14, so as to rotate about its rotation axis. In the example embodiment illustrated, this rotation axis is coaxial with the rotation axis 6. The second gear train also comprises a fourth sun-carrier plate 15 mounted on the output shaft 2 so as to be able to rotate with it, this output shaft being once again in the example in FIG. 1 coaxial with the rotation axis 6 and partially projecting out of the casing 4.

The output shaft 2 is arranged so as to be able to rotate freely with respect to the casing 4 and, in this example, it is designed so as to be hollow in order to serve as centred guidance for the interposed input shaft 14, which also partially projects out of the casing 4, so as to be able to rotate freely with respect to it.

In the casing 4, illustrated in FIG. 1, several pivot shafts 16 are supported parallel to the rotation axis 6, so as to be able to return freely on themselves but so as to driven in revolution about the rotation axis 6 when the casing 4 makes a rotation. Each pivot shaft 16 carries two planets 17 and 18 so that they rotate conjointly with this pivot shaft 16. Each of the planets 17 and 18 is in engagement with a sun-carrier plate 13 and 15.

In the example in FIG. 1, the rotary casing 4 has an engagement system, for example external teeth 19 depicted schematically, which can come into engagement with an external rotation transmission.

The diameters of the casing 4 of the planet-holder plates 13 and 15 and the planets 17 and 18 are chosen so as to establish between the interposed input shaft 14 and the output shaft 2 a preselected transmission ratio (which can be modified according to the invention as described below). In addition the double epicyclic gear train illustrated must be chosen so as to establish a given transmission ratio between the input rotation speed and the output rotation speed.

In the example illustrated in FIG. 1, a first intermediate shaft 20 is arranged parallel to the rotation axis 6, so as to be able to rotate on itself. It carries two toothed pinions 21 and 22 which are each capable, through a gear, of coming into engagement with the teeth 12 on the casing 3 and respectively the teeth 19 on the casing 4. This arrangement thus effects a first rotation transmission to an intermediate output of the casing 3, a transmission which is also engaged with the casing 4.

In this example also, the interposed output shaft 8 and the interposed input shaft 14 form together, or provide between them coaxially, an intermediate shaft 23 which thus effects a second rotation transmission between the first epicyclic gear train and the second, at an intermediate input of the latter.

A first motor brake 24 is arranged so as to be able to act on the first intermediate shaft 20. This motor brake can for example be a normal alternator, provided with coils, which is electrically connected to a control centre 25, for example a computer which integrates input data, such as the power of the drive engine, the rotation speed of the input shaft, the speed of the output shaft, etc, and which can act automatically on the motor brake 24 so that the latter either releases the intermediate shaft 20 or brakes it or possibly locks it, by varying the excitation of the coils. In the case of braking, the energy released is converted by the alternator into electric current.

A second motor brake 26 can also be arranged so as to be able to act on the second intermediate shaft 23, for example by means of toothed pinions depicted schematically. This second motor brake can for example be an electric motor which is electrically connected to the control centre 25, as well as to the first motor brake 24, in order to be supplied with current at least partially by the latter. The control centre 25 can act automatically on the motor brake 26 so that the latter either releases the intermediate shaft 23 or brakes it or locks it, by varying the current supply to the electric motor. The latter recovers the energy released by the first motor brake.

This arrangement thus makes it possible to separate, on two different axes (the two intermediate shafts) a single input speed, and this by means of the first gear train, which thus forms a first differential, to create an interaction between these two axes, by means of at least one of the motor brakes, before remixing the two speeds in the second gear train, which thus forms a second differential. This interaction makes it possible to continuously vary the ratio between the input speed and the output speed. This effect is obtained in particular because the speeds at the outputs of a differential are modified with respect to each other according to the torque.

If there is now applied to the system according to the invention the well-known Willis formula which the speeds obey in a differential, there is obtained for the first differential:

$$\omega_1 = \omega_8\left(\frac{d_7}{d_{11}} \times \frac{d_{10}}{d_5}\right) + \omega_3\left(1 - \left(\frac{d_7}{d_{11}} \times \frac{d_{10}}{d_5}\right)\right)$$

and for the second differential, where $\omega_{14}=\omega_8$, $$\omega_{14} = \omega_2\left(\frac{d_{15}}{d_{18}} \times \frac{d_{17}}{d_{13}}\right) + \omega_4\left(1 - \left(\frac{d_{15}}{d_{18}} \times \frac{d_{17}}{d_{13}}\right)\right),$$

In this equation, * represents the speed of rotation of the element indicated in the index, and d represents the diameter of the element indicated in the index.

In the case where $d_7=d_{11}$ and $d_5=8\times d_{10}$ in the first differential, and where $d_{15}=0.25\times d_{18}$ and $d_{13}=0.5\times d_{17}$ in the second differential, an output speed *2 is obtained which can vary between 16 times the input speed *1 and $-8/7$ times the input speed *1.

The first case corresponds to overdrive forward running and the second case to reverse running.

In the first case, the intermediate shaft 20 is locked by the motor brake 24 and the intermediate shaft 23 is free. In the second case the intermediate shaft 23 is locked by the motor brake 26 and the intermediate shaft 20 is released and turns in the opposite direction. The variation between these two limits is continued by the set of motor brakes which act on the intermediate shaft.

In practice, it will be preferable to choose the ratios *1/*2 so as to be greater than in this theoretical example, so that the extreme positions are never reached.

If in the example embodiment illustrated in FIG. 1 the rotation axes of the casing 3, of the casing 4, of the input shaft 1, of the output shaft 2, of the interposed output shaft 8 and of the interposed input shaft 14 are coaxial, it is possible to provide for some of them not to be so. It is possible for example for the transmission of rotation between the interposed output shaft 8 and the interposed input shaft 14 to form one or more return angles. The same applies to the transmission of rotation between the casing 3 and the casing 4.

Figure 2:
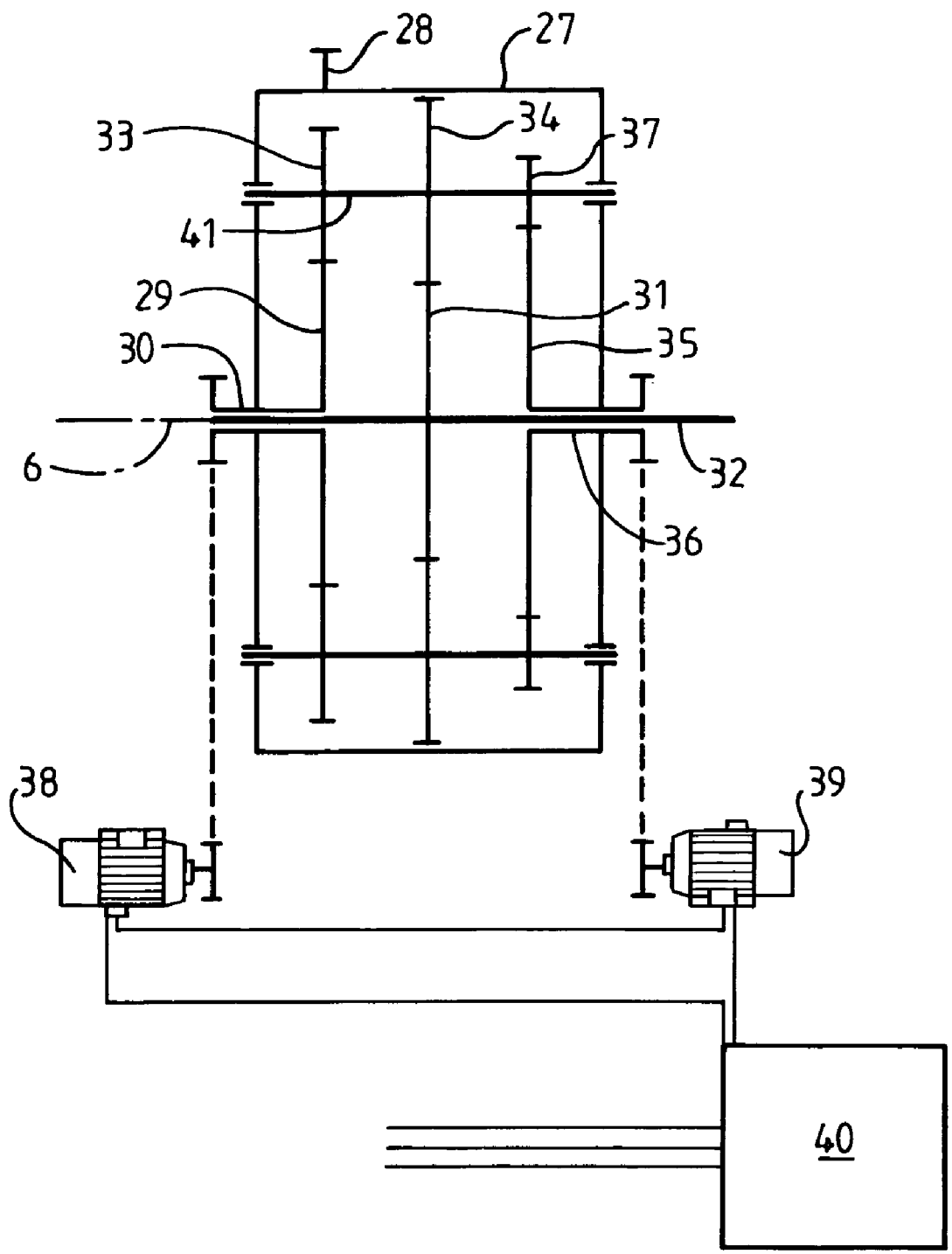
FIG. 2 depicts schematically another embodiment of an apparatus according to the invention.

In the embodiment illustrated in FIG. 2, the rotary casing 27 is the only one and the double epicyclic gear train is completely housed within it. It is with the rotary casing 27 that the drive engine is in engagement, through its external teeth 28. The rotary casing therefore here serves as a driving input.

The double gear train is formed by two trains merged in each other.

The first gear train comprises a sun-carrier plate 29 mounted on an interposed output shaft 30, so as to rotate with it, a central plate 31 mounted on the output shaft 32 so as to rotate with it and planets 33 and 34 arranged between the sun-holder plate 29 and respectively the central plate 31, on several pivot shafts 41 parallel to the rotation axis 6 of the casing. The planets are driven in revolution about this axis when the casing 27 makes a rotation. Each pivot shaft 41 carries two planets 33 and 34 which are each in engagement with the sun-carrier plate 29 or the central plate 31.

The second gear train comprises a sun-carrier plate 35, mounted on the interposed input shaft 36, so as to rotate about its rotation axis, and the central plate 31 described above. It also comprises planets, the planet 37 and the planet 34 described above. The planets 37 are each arranged, like the planets 33 and 34, on a pivot shaft 41.

The first rotation transmission comprises the interposed output shaft 30 by way of the first intermediate shaft on which the motor brake 38 acts through a set of gears. The second rotation transmission comprises the interposed input shaft 36 by way of second intermediate shaft on which the motor brake 39 acts. The two motor brakes are electrically connected to the control centre 40 and mutually to each other.

As can be seen, in the example in FIG. 2, the rotation axes of the casing 27, of the output shaft 32, of the interposed output shaft 30 and of the interposed input shaft 36, are coaxial.

This embodiment has the advantage of lesser size.

In general terms, the advantages of the transmission apparatus according to the invention are amongst others as follows:

they make it possible to make any engine rotate continuously at its best efficiency for the power demanded, which gives rise to minimum consumption, they give the engine its maximum power as from start-up or at any time, they make it possible to obtain a maximum output speed at maximum power, by choosing the input speed which will be preferable for the engine under these conditions, they reduce pollution, since the engine is always rotating at its maximum efficiency, they allow very rapid acceleration.

The efficiency of the transmission apparatus proper is very high and comparable to that of existing mechanical gearboxes, the transmission of power from the drive engine to the drivable receiving device taking place by means of gears as in the case of mechanical gearboxes.

It must be understood that the present invention is in no way limited to the embodiments described above and that many modifications can be made thereto within the scope of the accompanying claims.

The invention claimed is:

1. A speed transmission apparatus, arranged between a drive engine and a drivable receiving device, comprising
a first rotary casing arranged so as to be able to turn about a first axis of rotation,
a first epicyclic gear train which is arranged at least partially in said first rotary casing,
a second rotary casing arranged so as to be able to rotate about a fifth axis of rotation,
a second epicyclic gear train which is arranged at least partially in said second rotary casing,
said first and said second epicyclic gear train forming a double gear train located between a driving input connected to the drive engine and an output shaft arranged so as to be able to rotate about a second axis of rotation and connected to the drivable receiving device, said double gear train establishing between the driving input and the output shaft a transmission ratio between an input rotation speed and an output rotation speed, said first epicyclic gear train comprising an interposed output shaft mounted so as to turn with it, and said second epicyclic gear train comprising an interposed input shaft mounted so as to rotate with it, a first rotation transmission between said first and said second gear train comprising a transmission shaft which comes into engagement with each of said first and second rotary casings and which forms a first intermediate shaft able to rotate about a third axis of rotation, a second rotation transmission between said first and second gear trains which is arranged between said interposed output shaft of the first gear train and said interposed input shaft of said second gear train, and which comprises a second intermediary shaft able to rotate about a fourth axis of rotation, a first electric motor brake acting on one of said first and second intermediate shafts and capable of modifying a speed of rotation thereof, and control means electrically connected to and controlling the first motor brake so as to be able continuously to modify the speed of rotation of said one of said first and second intermediate shafts on which the first electric motor brake acts and, thus, also the transmission ratio between said input rotation speed and said output rotation speed.

2. Apparatus according to claim 1, characterised in that the interposed output shaft (8) and the interposed input shaft (14) form together said second intermediate shaft.

3. Apparatus according to claim 1, characterised in that the first and second rotation axes are coaxial, as well as the fourth and fifth rotation axes, all these axes also being able to be simultaneously coaxial.

4. Apparatus according to claim 1, characterised in that the control means (25, 40) are a computer capable of integrating input data and transmitting corresponding commands to the first motor brake and to a second motor brake.

5. Apparatus according to claim 1, characterised in that the first epicyclic gear train comprises an input shaft arranged at least partially in the first rotary casing so as to be able to rotate about the first rotation axis and in that this input shaft is connected to the drive engine and serves as said driving input.

6. Apparatus according to claim 5, characterised in that the first gear train comprises a first sun-carrier plate mounted on the input shaft so as to turn with it, a second sun-carrier plate mounted on the interposed output shaft so as to be able to turn with it, and first planets arranged between the first and second sun-carrier plates so as to be able to rotate with at least a first pivot shaft which is parallel to the first rotation axis and which makes a revolution about the latter during a rotation of the first casing, and in that the second gear train comprises a third sun-carrier plate mounted on the interposed input shaft, capable of rotating about the second rotation axis, so as to rotate with it, a fourth sun-carrier plate mounted on the output shaft so as to rotate with it, and second planets arranged between the third and fourth sun-carrier plates so as to be able to rotate together with at least a second pivot shaft which is parallel to the second rotation axis and which makes a revolution about the latter during a rotation of the second casing.

7. Apparatus according to claim 1, further comprising a second electric motor brake (26; 39) which acts on the other one of said first and second intermediate shafts, whilst being capable of modifying a speed of rotation thereof, following commands received from the control means.

8. The apparatus according to claim 7, wherein one of said first and second intermediate shafts has a first speed of rotation and the other one a second speed of rotation, the first speed of rotation being faster than the second one, wherein one of said motor brakes, which acts on said intermediate shaft having said first speed of rotation, is an alternator having coils, whose excitation is varied in order to obtain a variable brake effect, and which produces an electric current, and wherein the other one of said motor brakes, which acts on said intermediate shaft having said second speed of rotation, is an electric motor, which is supplied by electric current produced by said alternator and which makes it possible to obtain a variable acceleration effect.

9. A speed transmission apparatus, arranged between a drive engine and a drivable receiving device, comprising a first rotary casing (3, 27) arranged so as to be able to turn about a first axis of rotation (6), a double epicyclic gear train which comprises a first train and a second train and which is arranged at least partially in said first rotary casing (3, 27), between a driving input connected to the drive engine and an output shaft (2, 32), arranged so as to be able to rotate about a second axis of rotation and connected to the drivable receiving device, the above-mentioned double train establishing between the driving input and the output shaft (2, 32) a transmission ratio between an input rotation speed and an output rotation speed, a first rotation transmission (12, 20, 21; 30) arranged at an intermediate output of the first epicyclic gear train, a second rotation transmission (14; 36) arranged at an intermediate input of the second epicyclic gear train, a first intermediate shaft (20; 30) arranged in one of said first and second rotation transmissions, so as to be able to rotate about a third axis of rotation, a first electric motor brake (24; 38) acting on the first intermediate shaft (20; 30) and capable of modifying a speed of rotation thereof, control means (25; 40) electrically connected to, and controlling, the first motor brake (24; 38) so as to be able to continuously modify the speed rotation of the first intermediate shaft (20; 30) and therefore the transmission ratio between said input rotation speed and said output rotation speed, a second electric motor brake (26; 39) which acts on the second intermediate shaft, whilst being capable of modifying a speed of rotation thereof, following commands received from the control means, wherein the first epicyclic gear train comprises an input shaft arranged at least partially in the first rotary casing so as to be able to rotate about the first rotation axis, and wherein said input shaft is connected to the drive engine and serves as said driving input, and a second rotary casing (4) which is arranged so as to be able to rotate about a fifth rotation axis and in which there is housed the second epicyclic gear train of said double train, which allows a transmission of rotation to the output shaft (2), the first gear train being housed in the first rotary casing (3), wherein the first gear train comprises a first sun-carrier plate mounted on the input shaft so as to turn with it, a second sun-carrier plate mounted on an interposed output shaft so as to be able to turn with it, and first planets arranged between the first and second sun-carrier plates so as to be able to rotate with at least a first pivot shaft which is parallel to the first rotation axis and which makes a revolution about the latter during a rotation of the first casing, wherein the second gear train comprises a third sun-carrier plate mounted on an interposed input shaft, capable of rotating about the second rotation axis, so as to rotate with it, a fourth sun-carrier plate mounted on the output shaft so as to rotate with it, and second planets arranged between the third and fourth sun-carrier plates so as to be able to rotate together with at least a second pivot shaft which is parallel to the second rotation axis and which makes a revolution about the latter during a rotation of the second casing, and wherein said first rotation transmission comprises a transmission shaft which comes into engagement through sets of gears (12, 21, 19, 22) with each of the two rotary casings (3, 4) and which forms said first intermediate shaft (20) on which the first motor brake (24) acts, and in that said second rotation transmission is arranged between the interposed output shaft (8) of the first gear train and the interposed input shaft (14) of the second gear train.

10. Apparatus according to claim 9, characterised in that the interposed output shaft (8) and the interposed input shaft (14) form together said second intermediate shaft.

11. The apparatus according to claim 9, wherein one of said first and second intermediate shafts has a first speed of rotation and the other one a second speed of rotation, the first speed of rotation being faster than the second one, wherein one of said motor brakes, which acts on said intermediate shaft having said first speed of rotation, is an alternator having coils, whose excitation is varied in order to obtain a variable brake effect, and which produces an electric current, and wherein the other one of said motor brakes, which acts on said intermediate shaft having said second speed of rotation, is an electric motor, which is supplied by electric current produced by said alternator and which makes it possible to obtain a variable acceleration effect.

12. Apparatus according to claim 9, characterised in that the control means (25, 40) are a computer capable of integrating input data and transmitting corresponding commands to the first motor brake and to the second motor brake.

* * * * *